US012688172B2

(12) United States Patent
Shankar et al.

(10) Patent No.: US 12,688,172 B2
(45) Date of Patent: Jul. 21, 2026

(54) INDEXING CLOUD DATABASE LOGS IN A DISTRIBUTED DATABASE STORE

(71) Applicant: eBay Inc., San Jose, CA (US)

(72) Inventors: Ramesh Shankar, Redmond, WA (US); Navaneetha Krishnan Thanka Nadar, Bothell, WA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 19/007,441

(22) Filed: Dec. 31, 2024

(65) Prior Publication Data

US 2026/0187042 A1 Jul. 2, 2026

(51) Int. Cl.
*G06F 16/00* (2019.01)
*G06F 16/215* (2019.01)
*G06F 16/22* (2019.01)

(52) U.S. Cl.
CPC ........ *G06F 16/215* (2019.01); *G06F 16/2272* (2019.01)

(58) Field of Classification Search
None
See application file for complete search history.

(56) References Cited

U.S. PATENT DOCUMENTS

| | | | |
|---|---|---|---|
| 9,189,487 B2 | 11/2015 | Yu et al. | |
| 10,009,438 B2 | 6/2018 | Das | |
| 10,169,169 B1 | 1/2019 | Shaikh et al. | |
| 10,509,780 B2 * | 12/2019 | Brosch | G06F 16/2272 |
| 10,713,124 B2 | 7/2020 | Luo et al. | |
| 10,915,413 B2 * | 2/2021 | Heidel | G06F 11/1471 |
| 11,301,152 B1 | 4/2022 | Sillifant | |
| 12,242,505 B1 * | 3/2025 | Shankar | G06F 16/27 |
| 2022/0100618 A1 | 3/2022 | Jain et al. | |
| 2024/0095233 A1 | 3/2024 | Talagala et al. | |
| 2024/0281342 A1 | 8/2024 | Bedadala et al. | |

OTHER PUBLICATIONS

Lee, Sungjin, "FlexFS a Flexible Flash File System for MLC NAND Flash Memory", Seoul National University, KoreaSamsung Electronics, Korea, Jun. 2009, 14 pgs.
Extended European Search Report received for European Patent Application No. 25223396.0, mailed on May 20, 2026, 10 pages.
O'Neil et al., "The Log-structured Merge-tree (LSM-tree)", Acta Informatica, vol. 33, No. 4, Jul. 6, 1992, pp. 351-385.

* cited by examiner

*Primary Examiner* — Bai D Vu
(74) *Attorney, Agent, or Firm* — Shook Hardy & Bacon L.L.P.

(57) ABSTRACT

In an example embodiment, a transaction log index is used to index log records. The transaction log index comprises an in-memory transaction log index and an on-disk transaction log index. The log records are temporarily indexed in the in-memory transaction log index until the storage server can ensure that the corresponding log records are stored without any missing log records in a sequence, as well as possibly based on other correctness and performance considerations.

20 Claims, 7 Drawing Sheets

INDEXING CLOUD DATABASE LOGS IN A DISTRIBUTED DATABASE STORE

TECHNICAL FIELD

Examples of the present disclosure relate generally to database management systems and, more particularly, but not by way of limitation, to a system that generates indexes for transaction logs in a database management system.

BACKGROUND

Relational databases are databases that organize data into one or more tables (or "relations") of columns and rows. A database management system used to maintain relational databases is known as a relational database management system (RDBMS). In order for an RDBMS to operate efficiently and accurately, it follows a set of properties including atomicity, consistency, isolation, durability (ACID). Atomicity is a database property that ensures that either all or none of the series of database operations occur. The atomicity property ensures that the effects of a committed (user) transaction are durable, even if the system crashes after the transaction commits.

Databases often use fixed-sized pages to actually store the database state and user data, with the database pages residing in a page store. Atomicity is realized by recording every change made during a database transaction as log records in a transaction log to allow for complete recovery in case of database failure. For example, if a series of transactions affect an available quantity of an item in inventory, then a transaction log is updated each time a transaction is performed, meaning that a first transaction that increases the quantity of the item by three is recorded, then a second transaction that decreases the quantity of the item by two is recorded, and so on. The transaction log may comprise log records of variable sizes. Each log record may describe the actual transactions to be performed on one or more database pages (although in some instances the log records also describe operations not associated with a database page). Each log record may also be identified by a log record identifier. Transaction logs are stored in a log store. The database eventually applies the effects of the transactions in the transaction logs to the database pages in the page store.

It should be noted that while some example embodiments described herein relate to RDBMSs, the techniques and solutions described herein are not limited to RDBMSs and can apply to other types of database management systems.

SUMMARY

In an example embodiment, a transaction log index is used to index log records. The transaction log index comprises an in-memory transaction log index and an on-disk transaction log index. The log records are temporarily indexed in the in-memory transaction log index until the storage server can ensure that the corresponding log records are stored without any missing log records in a sequence, as well as possibly based on other correctness and performance considerations.

BRIEF DESCRIPTION OF THE DRAWINGS

Various ones of the appended drawings merely illustrate examples of the present disclosure and should not be considered as limiting its scope.

DETAILED DESCRIPTION

Figure 1:
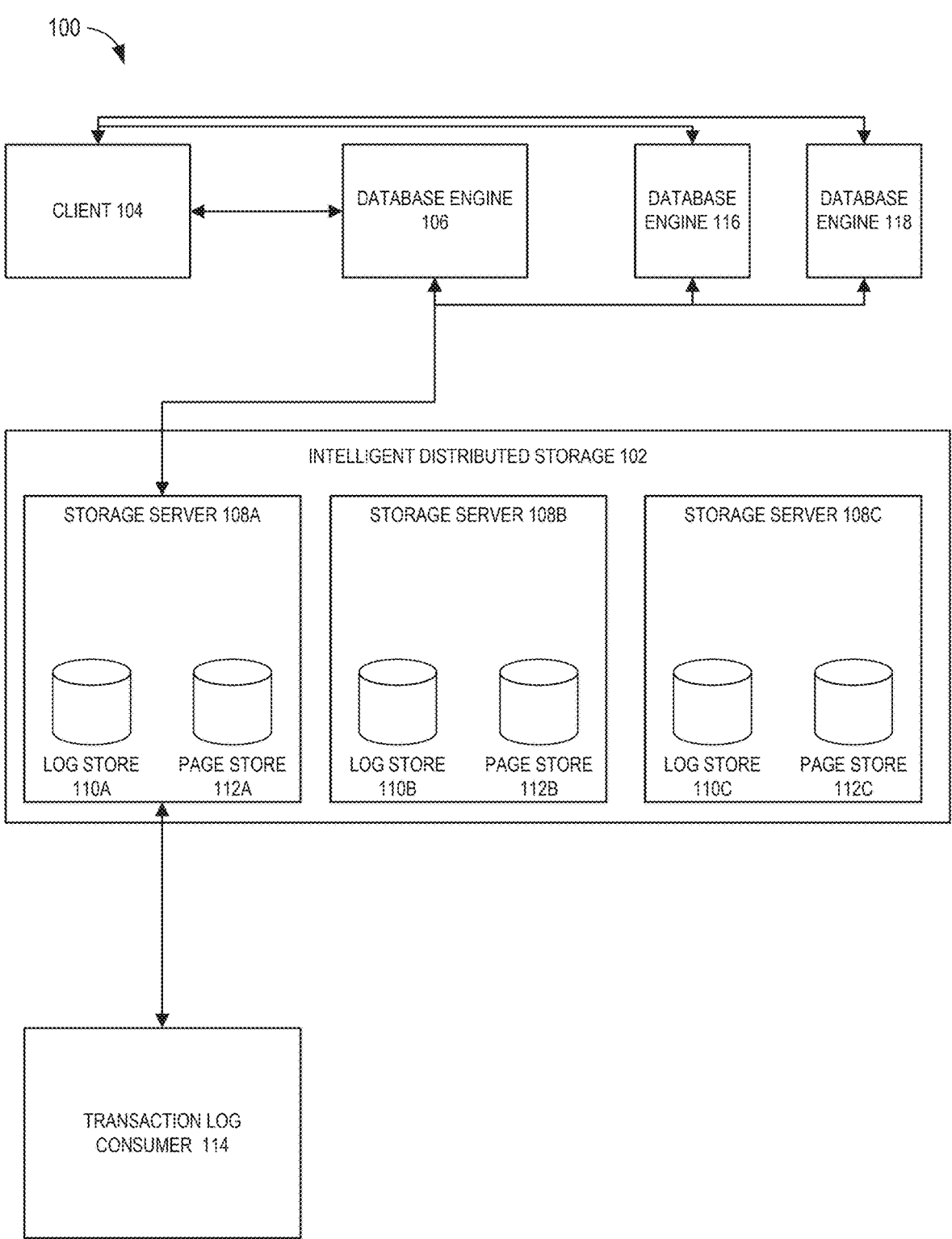
FIG. 1 is a block diagram illustrating a system utilizing an intelligent distributed storage, in accordance with an example embodiment.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Database Platform as a Service (dbPaaS) is a cloud-based service model that provides users with access to a database system without having to manage the underlying infrastructure, hardware, or software updates. The database system is fully managed by a cloud service provider.

In traditional database systems, distributed or not, a database engine controls the management of database transaction logs, their storage in the log store, and managing page updates in a database page store. In such systems, the storage itself does not contain significant functionality, except to act as a repository for data.

Significant functionality, scalability, and performance benefits can be realized, however, by offloading certain functions from the database engine to an intelligent storage, which has its own capabilities to perform those functions. In some embodiments, transaction log writes, log store management, and page store management are offloaded from the database engine to such an intelligent storage. Multiple database engines may use the same intelligent storage. In some instances, one of the database engines will be deemed a primary database engine and will have the ability to both read from and write to the intelligent storage, while the other database engines will be deemed secondary, and will only have the ability to read from the intelligent storage but not to write to it. In some systems, however, there is no distinction between primary and secondary database engines and multiple database engines can both read from and write to the intelligent storage.

Additionally, the data within the intelligent storage itself could be geo-replicated across multiple geographic locations, to enhance the availability, resilience, and performance of the distributed database system.

Technical problems, however, are encountered when offloading the responsibility for maintaining the underlying storage infrastructure from the database engine. The database engine generates and writes log records, which are identified by log record identifiers, to the distributed storage. In some embodiments this numerical identification is a log sequence number (LSN). Each LSN identifies the corresponding log record and thus can be used to retrieve the required log records when needed. This is true even if the log records are stored in a distributed manner. The identifier need not be an LSN, but there is some level of "order" to the identifier, such that the identifiers can be ordered in a sequence, such as if the identifiers are sequential numbers.

Additionally, for various reasons, some of the log records may be missing. Various consumers utilize procedures that need to retrieve the database transaction logs in sorted order without any missing log records.

Thus, in an example embodiment, a storage server hosting log stores is responsible for ensuring that there are no missing log records in its transaction logs and that the log records are retrievable in sorted order based on their respective identifiers.

FIG. 1 is a block diagram illustrating a system 100 utilizing an intelligent distributed storage, in accordance with an example embodiment. A client 104 interacts with a database engine 106, such as by making create, read, update, and delete requests to the database engine 106.

The database engine 106 processes the transactions requested by the client 104 and generates transaction logs that record these transactions. The database engine 106 sends these transaction logs to storage servers like storage server 108A of the intelligent distributed storage 102. The storage server 108A is responsible for persisting the transaction logs in the log store 110A, and applying the transaction logs at an appropriate time to the page store 112A. There may be additional distributed storage servers 108B, 108C in the intelligent distributed storage 102, each with their own respective log store 110B, 110C and page store 112B, 112C.

It should be noted that while only a single log store and single page store are depicted within each storage server, in actuality, there may be many different log stores and page stores within a single storage server.

Technical issues can occur when a storage server is missing log records in a sequence from its log store. These technical issues can occur due to the fact that the database engine 106 generates batches of log records for each storage server, such as storage server 108A, and these batches can be sent, received, or processed out of order at the storage server 108A. Additionally, it is also possible for a storage server 108A to miss a batch, such as if it is temporarily unavailable or if the batch is rejected due to resource constraints.

Figure 2:
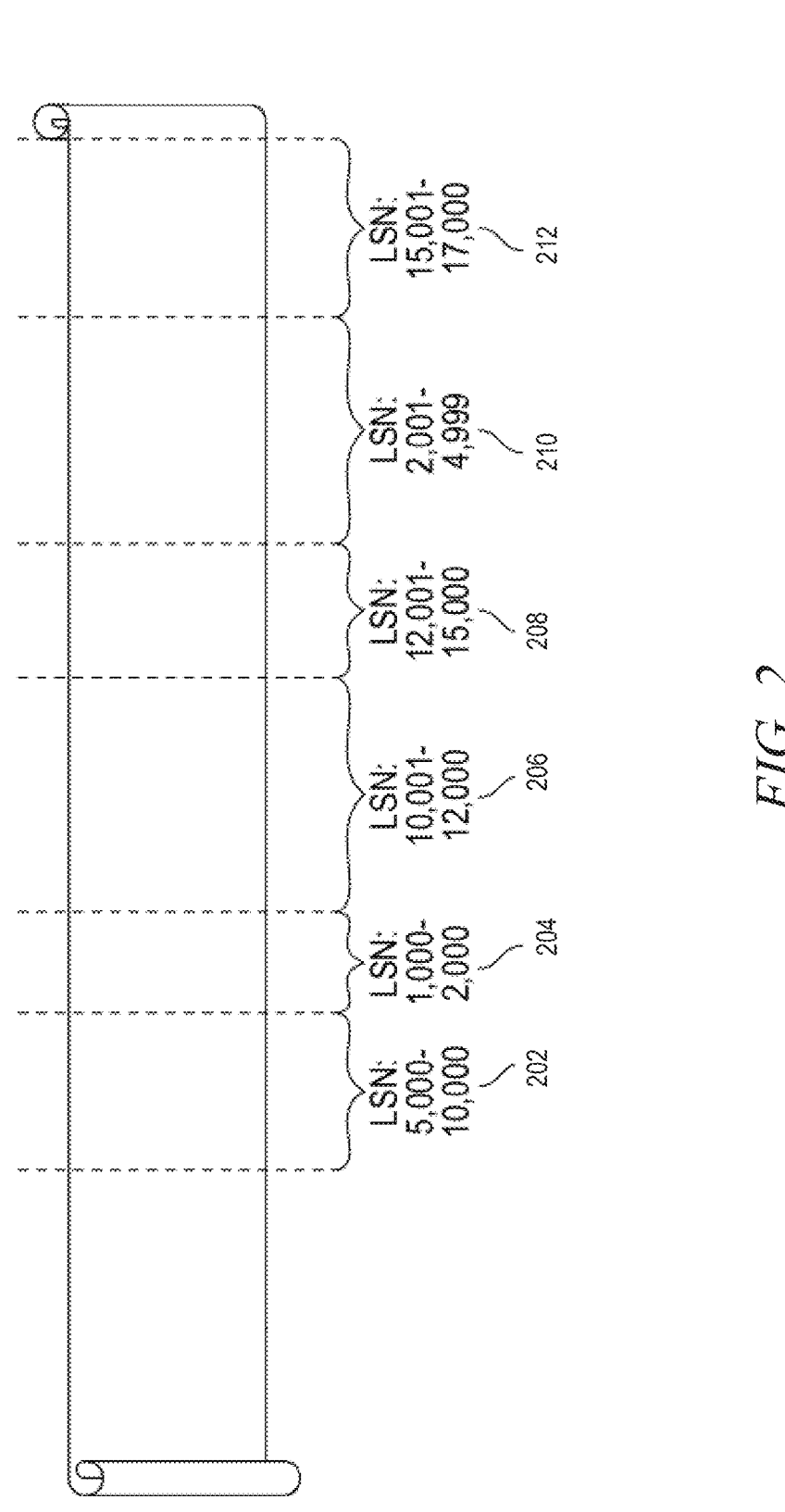
FIG. 2 is an example transaction log, in accordance with an example embodiment.

FIG. 2 is an example transaction log 200. Here, the transaction log 200 contains many log records. These log records may be stored, however, out of order with each other. Thus, for example log records having log record identifiers in the range between 5,000 and 10,000, depicted as reference numeral 202, are stored before log records having log record identifiers in the range between 1,000 and 2,000, depicted as reference numeral 204. Similar issues occur with the log record identifiers in other ranges 206, 208, 210, 212.

The storage of the log records out of order and/or missing one or more log records causes problems for transaction log consumers, such as transaction log consumer 114 in FIG. 1. If, for example, it is necessary for a transaction log consumer 114 to read transaction log records sequentially from log record with log record identifier 5,000 to the log record with log record identifier 5,010, it very easily could be the case that the log records in this sequence are not all stored in the corresponding log store yet, or even if they are that they are stored in sequential order.

In an example embodiment, a transaction log index is used to index log records. The transaction log index comprises an in-memory transaction log index and an on-disk transaction log index. Once the log records sent by the database engine have been persisted to the log store by a storage server, the log record identifiers are indexed in the in-memory transaction log index. The in-memory transaction log index is used until the storage server can ensure that the range of the log records being indexed is complete, without any missing log records.

Performing a write of a portion of the in-memory transaction log index suitably to the on-disk transaction log index (called a "spill") may be performed asynchronously, to ensure that the database engine's 106 log write operation latency remains low, which is desirable for performance and scalability. The spill is performed based on correctness and performance considerations. Until that spill occurs, the in-memory transaction log index enables consumers to read range of log records in sorted order. The on-disk transaction log index does not have any missing log records.

Figure 3:
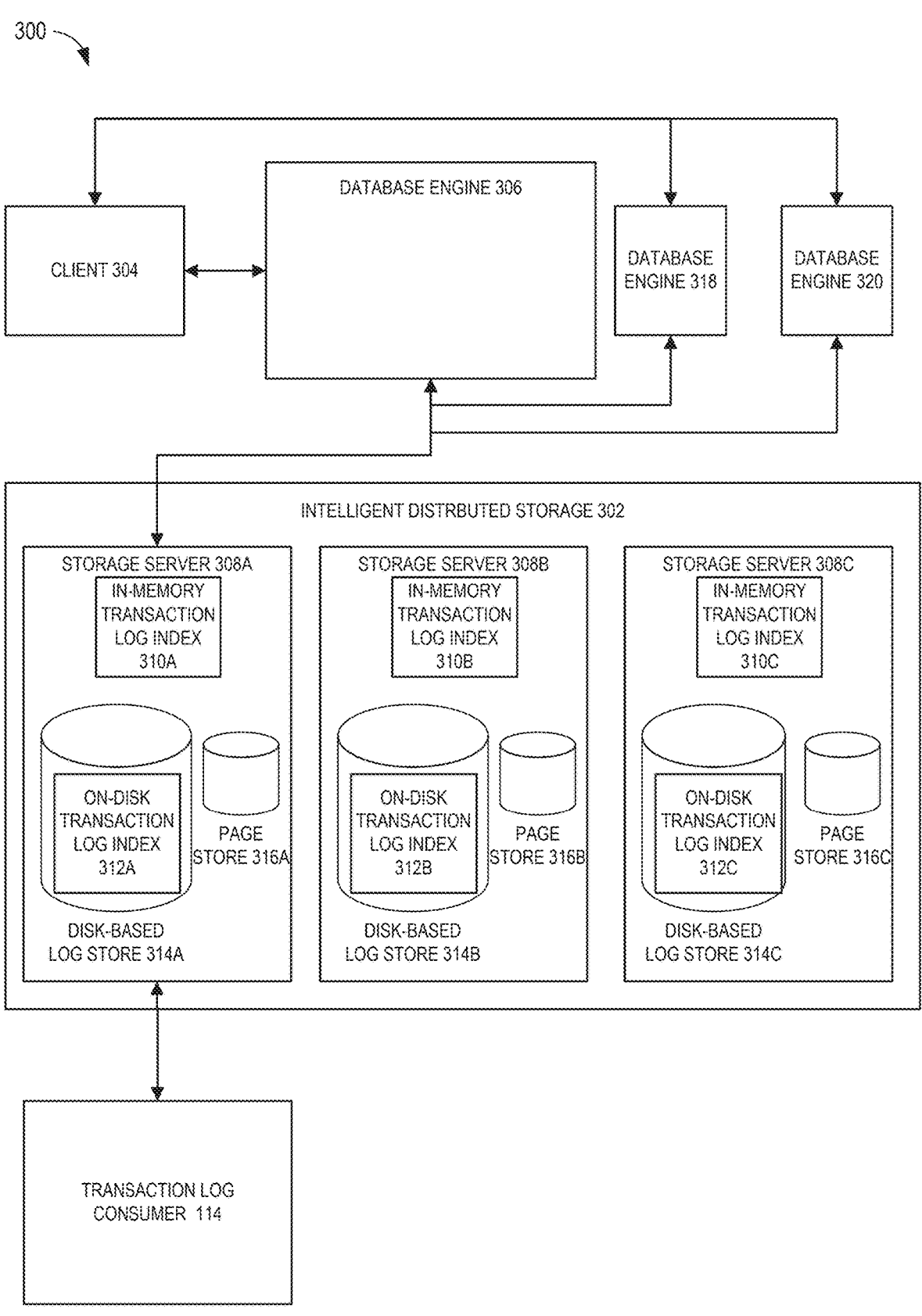
FIG. 3 is a block diagram illustrating a system utilizing an intelligent distributed storage, using a transaction log index, in accordance with an example embodiment.

FIG. 3 is a block diagram illustrating a system 300 utilizing an intelligent distributed storage 302, using a transaction log index, in accordance with an example embodiment. The system 300 is similar to system 100 of FIG. 1, with a client 304 interacting with a database engine 306, such as by making create, read, update, and delete requests to it. The database engine 306 processes the transactions requested by the client 304 and generates transaction logs that record these transactions. The database engine 306 sends these transaction logs to storage servers like storage server 308A of the intelligent distributed storage 302. Here, however, the storage server 308A maintains an in-memory transaction log index 310A and an on-disk transaction log index 312A. Both these indexes act to index the contents of the disk-based log store 314A.

Log records are indexed by the in-memory transaction log index 310A after they have been persisted to the log store. Thus, for the aforementioned reasons, this may mean that the in-memory transaction log index 310A indexes an incomplete range of log records. On the other hand, the on-disk transaction log index 312A stores log records in a complete range, and without any missing log records in that range. In other words, while the in-memory transaction log index 310A may be missing one or more log records in a sequence, the on-disk transaction log index 312A in the disk-based log storage 314A is not missing any log records in any sequence. Thus, the in-memory transaction log index 310A acts as a temporary index of log records until the range to be spilled is complete, as well as facilitating asynchronous updates of the on-disk transaction log index 312A.

In some example embodiments, the in-memory transaction log index 310A may point to only the persisted transactions logs stored in the disk-based log storage 314A. In other example embodiments, the in-memory transaction log index 310A points to transaction logs persisted in the disk-based log storage 314A as well as transaction logs maintained in memory.

The term "in-memory" here refers to a data storage that is maintained in volatile memory, such as system memory like random access memory (RAM). "Disk-based" here refers to data storage that is maintained in non-volatile memory, such as on a hard disk drive or solid-state drive.

A sequence of log records in the in-memory transaction log index 310A is spilled to the on-disk transaction log index 312A asynchronously, when there are no missing log records in it. There may be additional considerations on when the spilling occurs based on correctness and/or performance requirements. A range of log records can only be removed from the in-memory transaction log index after that range has been indexed by the on-disk index as part of a spill operation. Note that in this example embodiment, the database engine 306 is the primary database engine, while database engine 318 and database engine 320 are secondary.

There are multiple ways the on-disk transaction log index can be constructed. In an example embodiment, a 2-level transaction log index is used. Other types of transaction log indexes can be used, however, such as 1-level and 3-level transaction log indexes.

Additionally, as with FIG. 1, the intelligent distributed storage 302 may maintain multiple storage servers, such as storage servers 308A, 308B, 308C, each of which have their own in-memory transaction log index 310A, 310B, 310C, on-disk transaction log index 312A, 312B, 312C, disk-based log store 314A, 314B, 314C, and page store 316A, 316B, 316C.

Figure 4:
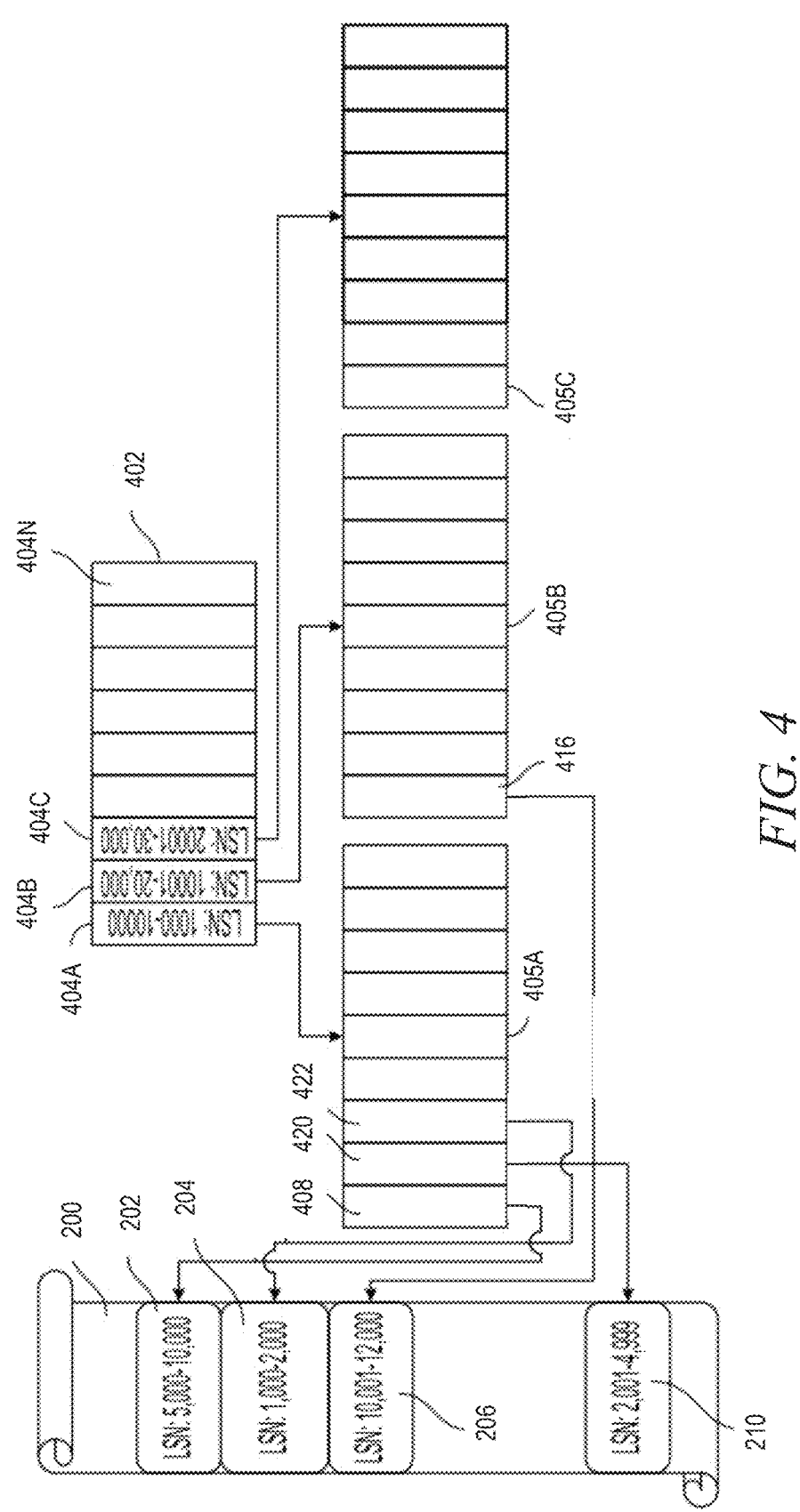
FIG. 4 is a block diagram illustrating an on-disk transaction log index, in accordance with an example embodiment.

FIG. 4 is a block diagram illustrating an on-disk transaction log index 400, in accordance with an example embodiment. Here, a root node 402 contains entries 404A, 404B, 404C, . . . , 404N that identify leaf nodes 405A, 405B, 405C as having a given range of entries. For example, the root node entry 404A identifies the leaf node 405A that is responsible for log record identifiers 1,000-10,000. Each leaf node entry (e.g., 408, 416, 420, 422) is also responsible for a range of log record identifiers, and contains sorted entries. It should be noted that these are merely examples of data structures that can be used and other formats of data structures can be used to accomplish the same goals.

It should also be noted that while the organization of the on-disk transaction log index 400 may appear similar to that of a B-tree or B+ tree, it is not the same. More specifically, in the on-disk transaction log index 400 there is no need for splits or merges of nodes, like in a B-tree or B+ tree. Since the maximum size of a log store is fixed, the on-disk transaction log index can also be readily sized. Due to the simplicity of the data structure, dynamically scaling up the root node and adding new leaf nodes is relatively straightforward. Furthermore, the root and/or leaf nodes can be reused in the steady state without having to allocate or free root or leaf nodes. They also do not require merges and compaction across multiple levels, like Log Structured Merge (LSM) trees, and no input/output amplification occurs.

Entries are in sorted log record identifier order in both the root and leaf nodes. This allows for binary search to be performed to quickly locate a log record entry of interest, at least in scenarios where the log record entries are stored in a simple sequence. Other embodiments are foreseen where the log record entries are stored in something other than a simple sequence, although even in these cases there will be some efficient searching algorithm to use to locate the log record entries of interest.

There are multiple ways the log record identifiers can be stored in the on-disk transaction log index. In an example embodiment, a 2-level transaction log index is used. Other types of transaction log indexes can be used, however, such as 1-level and 3-level transaction log indexes.

Figure 5:
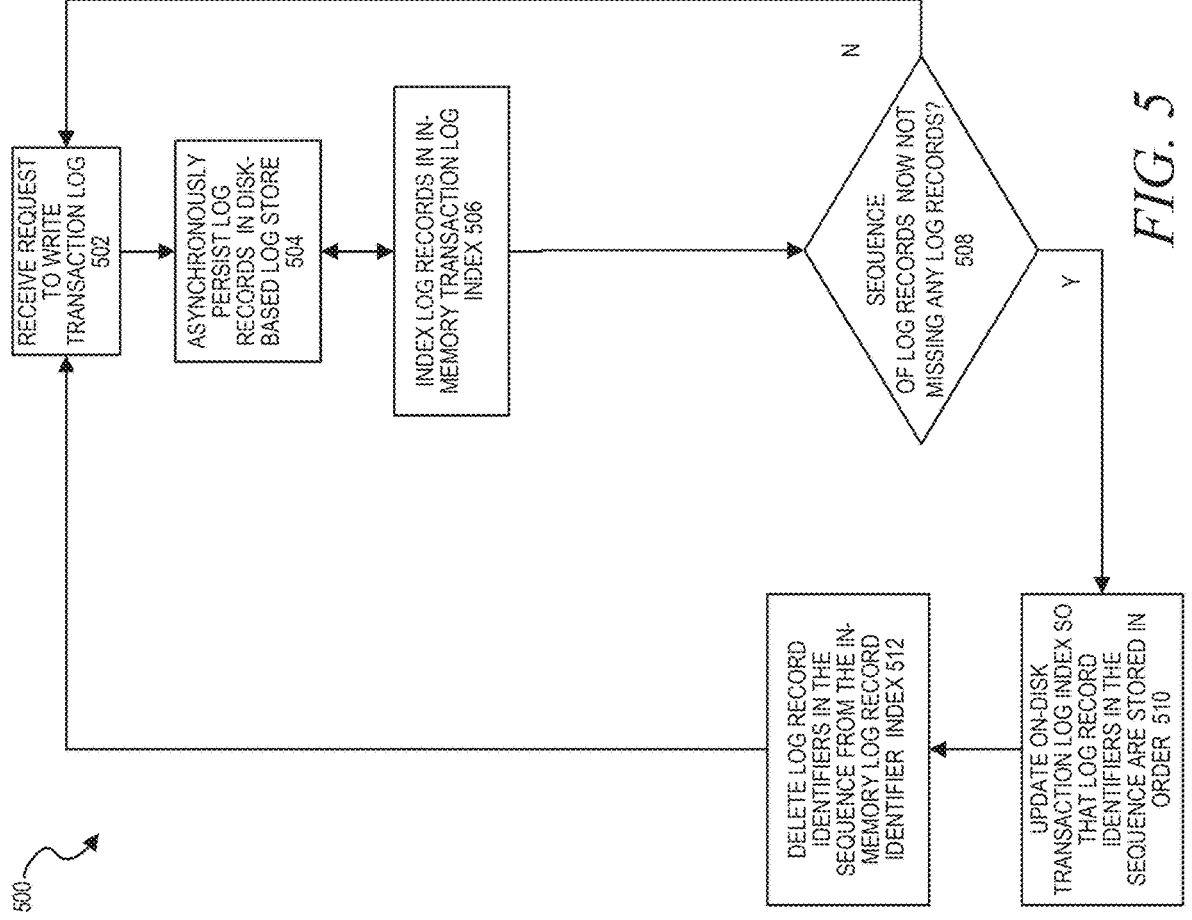
FIG. 5 is a flow diagram illustrating a method for indexing database logs identifiers in a database store, in accordance with an example embodiment.

FIG. 5 is a flow diagram illustrating a method 500 for indexing database transaction logs identifiers in a database store, in accordance with an example embodiment. At operation 502, a request is received by a storage server to write a set of log records pertaining to a plurality of database transactions. These log records may be out of order, and some within a given range may even be missing.

At operation 504, the transaction log is asynchronously persisted in the disk-based log store. At operation 506, the log records are indexed in an in-memory transaction log index. At operation 508, it is determined if the sequence of log records is now not missing any log records. It should be noted that there may be additional considerations at this step as well, such as whether the system is generally ready to spill contents of the in-memory transaction log index to the on-disk transaction log index based on correctness and/or performance considerations. If not, then the method 500 may loop to operation 502 to process additional log records sent by the database engine.

If at operation 508 it is determined that the sequence of log records is now not missing any log records (and any correctness and/or performance considerations are met), then at operation 510 the on-disk transaction log index is updated so that all the log record identifiers in the sequence are indexed. Then at operation 512, the log record identifiers in the sequence are deleted from the in-memory transaction log index.

It should be noted that operations 508, 510 and 512 can be performed in parallel/asynchronously from operations 502, 504, and 506, rather than needing to be performed after. Thus, the method 500 technically continuously loops around operations 502, 504, and 506 and when operation 508 detects that the sequence of log records is now in order and not missing any log records, then operations 510 and 512 are performed. This is why operation 506 appears to flow back to operation 502 in addition to flowing to operation 508.

Figure 6:
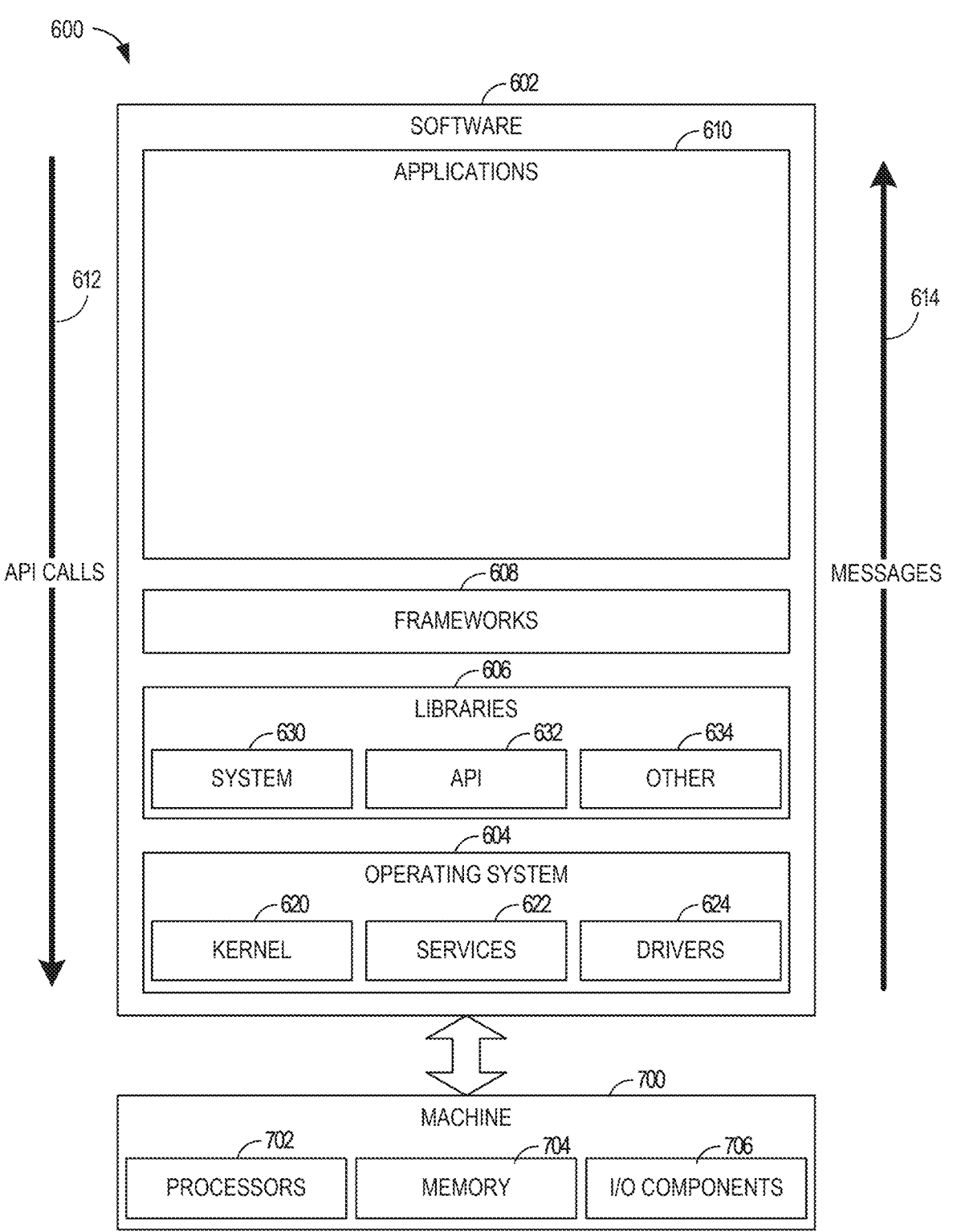
FIG. 6 is a block diagram illustrating a software architecture, which may be installed on any one or more of the devices described above.

FIG. 6 is a block diagram 600 illustrating a software architecture 602, which may be installed on any one or more of the devices described above. FIG. 6 is merely a non-limiting example of a software architecture, and it will be appreciated that many other architectures may be implemented to facilitate the functionality described herein. The software architecture 602 may be implemented by hardware such as a computer system 700 of FIG. 7 that includes one or more processors 702, memory 704 and I/O components 706. In this example, the software architecture 602 may be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 612 through the software stack and receive messages 614 in response to the API calls 612, according to some implementations.

In various implementations, the operating system 604 manages hardware resources and provides common services. The operating system 604 includes, for example, a kernel 620, services 622, and drivers 624. The kernel 620 acts as an abstraction layer between the hardware and the other software layers in some implementations. For example, the kernel 620 provides memory management, processor management (e.g., scheduling), component management, networking, and security settings, among other functionalities. The services 622 may provide other common services for the other software layers. The drivers 624 may be responsible for controlling or interfacing with the underlying hardware. For instance, the drivers 624 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 606 provide a low-level common infrastructure that may be utilized by the applications 610. The libraries 606 may include system libraries 630 (e.g., C standard library) that may provide functions such as memory allocation functions, string manipulation functions, mathematic functions, and the like. In addition, the libraries 606 may include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 606 may also include a wide variety of other libraries 634 to provide many other APIs to the applications 610.

The frameworks 608 provide a high-level common infrastructure that may be utilized by the applications 610, according to some implementations. For example, the frameworks 608 provide various graphic user interface (GUI) functions, high-level resource management, high-level location services, and so forth. The frameworks 608 may provide a broad spectrum of other APIs that may be utilized by the applications 610, some of which may be specific to a particular operating system or platform.

According to some examples, the applications 610 are programs that execute functions defined in the programs. Various programming languages may be employed to create one or more of the applications 610, structured in a variety of manners, such as object-orientated programming languages (e.g., Objective-C, Java, or C++) or procedural programming languages (e.g., C or assembly language).

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client or server computer system) or one or more processors may be configured by software (e.g., an application or application portion) as a hardware-implemented module that operates to perform certain operations as described herein.

In various examples, a hardware-implemented module may be implemented mechanically or electronically. For example, a hardware-implemented module may include dedicated circuitry or logic that is permanently configured (e.g., as a special-purpose processor, such as a field programmable gate array (FPGA) or an application-specific integrated circuit (ASIC)) to perform certain operations. A hardware-implemented module may also include programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, include processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some examples, the processor or processors may be located in a single location (e.g., within a home environment, an office environment or as a server farm), while in other examples, the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via the network (e.g., the Internet) and via one or more appropriate interfaces (e.g., application program interfaces (APIs).)

Examples may be implemented in digital electronic circuitry, or in computer hardware, firmware, software, or in combinations of them. Examples may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers, at one site or distributed across multiple sites, and interconnected by a communication network.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various examples.

Figure 7:
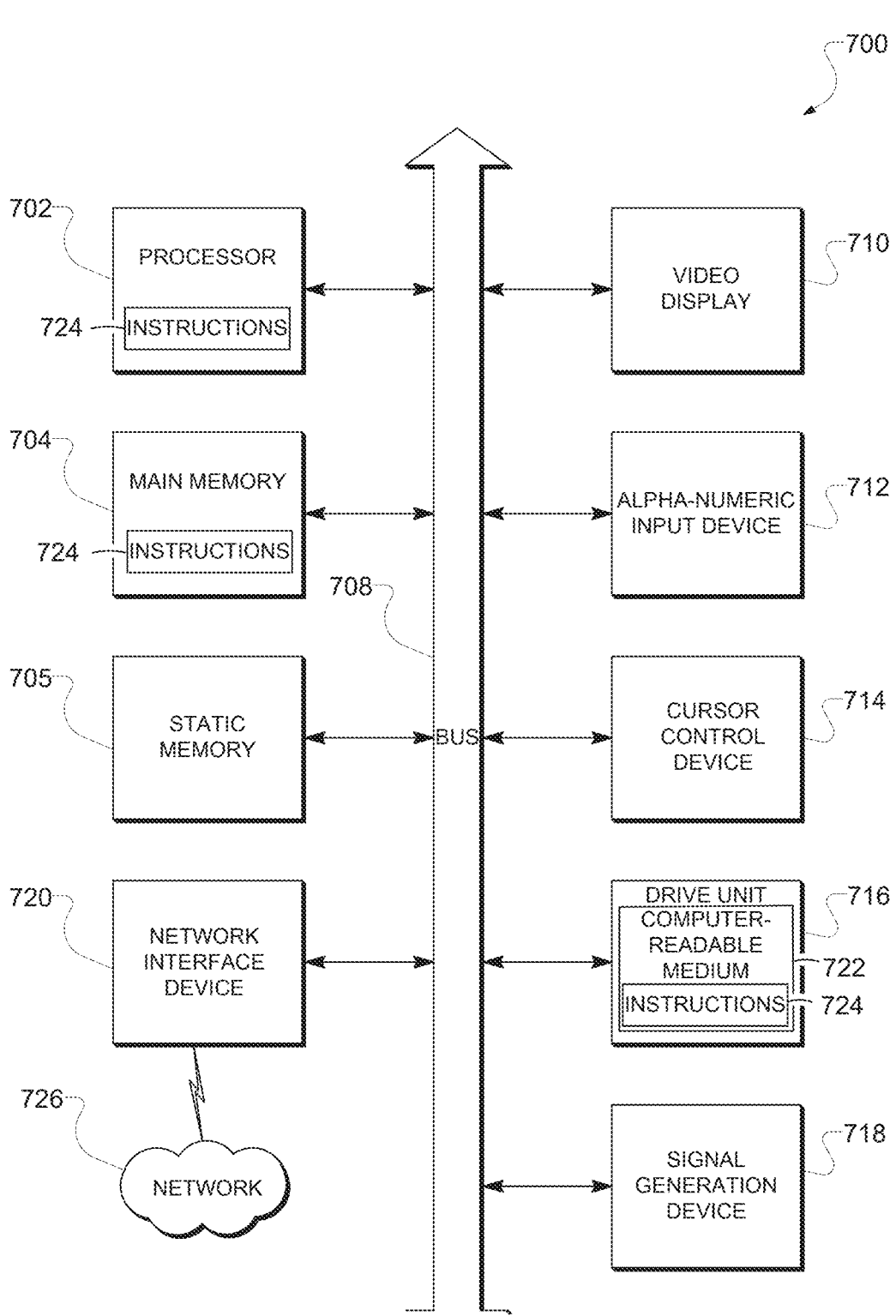
FIG. 7 is a block diagram of a machine within which instructions may be executed for causing the machine to perform any one or more of the methodologies discussed herein.

FIG. 7 is a block diagram of a machine within which instructions may be executed for causing the machine to perform any one or more of the methodologies discussed herein. In one example, the machine may be any of the devices described above. In alternative examples, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. Further, while only a single machine is illustrated, the term "machine" shall also be taken to include any collection of machines that, individually or jointly, execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 705, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device (cursor control device) 714 (e.g., a mouse), a disk drive unit 716, a signal generation device 718 (e.g., a speaker) and a network interface device 720.

The drive unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media. Instructions 724 may also reside within the static memory 705.

While the machine-readable medium 722 is shown in an example to be a single medium, the term "machine-readable medium" may include a single medium or multiple media (e.g., a centralized or distributed database, and/or associated caches and servers) that store the one or more instructions or data instructions 724. The term "machine-readable medium" shall also be taken to include any tangible medium that is capable of storing, encoding or carrying instructions 724 for execution by the machine and that cause the machine to perform any one or more of the methodologies of the present invention, or that is capable of storing, encoding or carrying data structures utilized by or associated with such instructions 724. The term "machine-readable medium" shall accordingly be taken to include, but not be limited to, solid-state memories, and optical and magnetic media. Specific examples of machine-readable media include nonvolatile memory, including by way of example, semiconductor memory devices, e.g., erasable programmable read-only memory (EPROM), electrically erasable programmable read-only memory (EEPROM), and flash memory devices; magnetic disks, such as internal hard disks and removable disks; magneto-optical disks; and CD-ROM and DVD-ROM disks.

The instructions 724 may further be transmitted or received over the network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding or carrying instructions 724 for execution by the machine, and includes digital or analog communications signals or other intangible media to facilitate communication of such software.

In various example examples, one or more portions of the network 726 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 726 or a portion of the network 726 may include a wireless or cellular network, and a coupling may be a Code Division Multiple Access (CDMA) connection, a Global System for Mobile communications (GSM) connection, or another type of cellular or wireless coupling. In this example, a coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology. Although an example has been described with reference to specific examples, it will be evident that various modifications and changes may be made to these examples without departing from the broader spirit and scope of the invention. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

Such examples of the inventive subject matter may be referred to herein, individually and/or collectively, by the term "invention" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 724 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media, at least some of which are covered under the term "signal medium" discussed below.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to various devices. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," "device-readable medium," and "machine storage medium," mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Described implementations of the subject matter can include one or more features, alone or in combination, as illustrated below by way of example.

Example 1 is a system comprising: at least one processor; and memory comprising instructions that, when executed by the at least one processor, cause the system to perform operations comprising: receiving a request to write a transaction log pertaining to a plurality of database transactions, the transaction log having a plurality of log records, each log record having an identifier; asynchronously storing the transaction log in a disk-based log store; indexing the log records in an in-memory transaction log index; in response to a determination that the plurality of log records are not missing any log records in a sequence of log records, updating an on-disk transaction log index in the disk-based log store; and deleting the log records in the sequence from the in-memory transaction log index.

In Example 2, the subject matter of Example 1 includes, wherein the updating of the on-disk transaction log index is further performed in response to one or more additional correctness and/or performance considerations.

In Example 3, the subject matter of Examples 1-2 includes, wherein the updating further comprises persisting all log record identifiers equal to or below a certain value to the on-disk transaction log index while maintaining all log record identifiers above the certain value in the in-memory transaction log index, and wherein the deleting the log record identifiers comprises deleting log record identifiers equal to or below the certain value from the in-memory transaction log index.

In Example 4, the subject matter of Examples 1-3 includes, wherein the on-disk transaction log index is two levels, a root node and a plurality of leaf nodes, wherein the root node contains root node entries, each root node entry pointing to a leaf node containing log record identifiers within a specified range.

In Example 5, the subject matter of Example 4 includes, wherein each entry in the leaf nodes identifies a range of log records in the disk-based log store.

In Example 6, the subject matter of Examples 4-5 includes, wherein existing root and leaf nodes are reused without allocating or freeing root or leaf nodes.

In Example 7, the subject matter of Example 6 includes, wherein no split or merge operation is performed on nodes of the on-disk transaction log index.

In Example 8, the subject matter of Examples 6-7 includes, wherein no merge or compaction operation is performed across levels of the on-disk transaction log index and there is no amplification of input or output operations in the on-disk transaction log index.

Example 9 is a machine-storage medium having instructions embodied thereon, the instructions executable by a processor of a machine to perform operations comprising: receiving a request to write a transaction log pertaining to a plurality of database transactions, the transaction log having a plurality of log records, each log record having an identifier; asynchronously storing the transaction log in a disk-based log store; indexing the log records in an in-memory transaction log index; in response to a determination that the plurality of log records are not missing any log records in a sequence of log records, updating an on-disk transaction log index in the disk-based log store; and deleting the log records in the sequence from the in-memory transaction log index.

In Example 10, the subject matter of Example 9 includes, wherein the updating of the on-disk transaction log index is further performed in response to one or more additional correctness and/or performance considerations.

In Example 11, the subject matter of Examples 9-10 includes, wherein the updating further comprises persisting all log record identifiers equal to or below a certain value to the on-disk transaction log index while maintaining all log record identifiers above the certain value in the in-memory transaction log index, and wherein the deleting the log record identifiers comprises deleting log record identifiers equal to or below the certain value from the in-memory transaction log index.

In Example 12, the subject matter of Examples 9-11 includes, wherein the on-disk transaction log index is two levels, a root node and a plurality of leaf nodes, wherein the root node contains root node entries, each root node entry pointing to a leaf node containing log record identifiers within a specified range.

In Example 13, the subject matter of Example 12 includes, wherein each entry in the leaf nodes identifies a range of log records in the disk-based log store.

In Example 14, the subject matter of Examples 12-13 includes, wherein existing root and leaf nodes are reused without allocating or freeing root or leaf nodes.

In Example 15, the subject matter of Example 14 includes, wherein no split or merge operation is performed on nodes of the on-disk transaction log index.

In Example 16, the subject matter of Examples 14-15 includes, wherein no merge or compaction operation is performed across levels of the on-disk transaction log index and there is no amplification of input or output operations in the on-disk transaction log index.

Example 17 is a method comprising: receiving a request to write a transaction log pertaining to a plurality of database transactions, the transaction log having a plurality of log records, each log record having an identifier; asynchronously storing the transaction log in a disk-based log store; indexing the log records in an in-memory transaction log index; in response to a determination that the plurality of log records are not missing any log records in a sequence of log records, updating an on-disk transaction log index in the disk-based log store; and deleting the log records in the sequence from the in-memory transaction log index.

In Example 18, the subject matter of Example 17 includes, wherein the updating of the on-disk transaction log index is further performed in response to one or more additional correctness and/or performance considerations.

In Example 19, the subject matter of Examples 17-18 includes, wherein the updating further comprises persisting all log record identifiers equal to or below a certain value to the on-disk transaction log index while maintaining all log record identifiers above the certain value in the in-memory transaction log index, and wherein the deleting the log record identifiers comprises deleting log record identifiers equal to or below the certain value from the in-memory transaction log index.

In Example 20, the subject matter of Examples 17-19 includes, wherein the on-disk transaction log index is two levels, a root node and a plurality of leaf nodes, wherein the root node contains root node entries, each root node entry pointing to a leaf node containing log record identifiers within a specified range.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A system comprising:
at least one processor; and
memory comprising instructions that, when executed by the at least one processor, cause the system to perform operations comprising:
receiving a request to write a transaction log pertaining to a plurality of database transactions, the transaction log having a plurality of log records, each log record having an identifier;
asynchronously storing the transaction log in a disk-based log store;
indexing the plurality of log records in an in-memory transaction log index;
in response to a determination that the plurality of log records are not missing any log records in an ordered sequence of log records, updating an on-disk transaction log index in the disk-based log store by storing log record identifiers in the on-disk transaction log index in order; and deleting the plurality of log records in the ordered sequence from the in-memory transaction log index, to allow in-memory index capacity to be reclaimed after an ordered on-disk update.

2. The system of claim 1, wherein the updating of the on-disk transaction log index is further performed in response to at least one of one or more additional correctness and one or more performance considerations.

3. The system of claim 1, wherein the updating further comprises persisting all log record identifiers equal to or below a certain value to the on-disk transaction log index while maintaining all log record identifiers above the certain value in the in-memory transaction log index, and wherein the deleting the log record identifiers comprises deleting log record identifiers equal to or below the certain value from the in-memory transaction log index.

4. The system of claim 1, wherein the on-disk transaction log index is two levels, a root node and a plurality of leaf nodes, wherein the root node contains root node entries, each root node entry pointing to a leaf node containing log record identifiers within a specified range.

5. The system of claim 4, wherein each entry in the leaf nodes identifies a range of log records in the disk-based log store.

6. The system of claim 4, wherein existing root and leaf nodes are reused without allocating or freeing root or leaf nodes.

7. The system of claim 6, wherein no split or merge operation is performed on nodes of the on-disk transaction log index.

8. The system of claim 6, wherein no merge or compaction operation is performed across levels of the on-disk transaction log index and there is no amplification of input or output operations in the on-disk transaction log index.

9. A machine-storage medium having instructions embodied thereon, the instructions executable by a processor of a machine to perform operations comprising:

receiving a request to write a transaction log pertaining to a plurality of database transactions, the transaction log having a plurality of log records, each log record having an identifier;

asynchronously storing the transaction log in a disk-based log store;

indexing the plurality of log records in an in-memory transaction log index;

in response to a determination that the plurality of log records are not missing any log records in an ordered sequence of log records, updating an on-disk transaction log index in the disk-based log store by storing log record identifiers in the on-disk transaction log index in order; and deleting the plurality of log records in the ordered sequence from the in-memory transaction log index, to allow in-memory index capacity to be reclaimed after an ordered on-disk update.

10. The machine-storage medium of claim 9, wherein the updating of the on-disk transaction log index is further performed in response to at least one of one or more additional correctness and one or more performance considerations.

11. The machine-storage medium of claim 9, wherein the updating further comprises persisting all log record identifiers equal to or below a certain value to the on-disk transaction log index while maintaining all log record identifiers above the certain value in the in-memory transaction log index, and wherein the deleting the log record identifiers comprises deleting log record identifiers equal to or below the certain value from the in-memory transaction log index.

12. The machine-storage medium of claim 9, wherein the on-disk transaction log index is two levels, a root node and a plurality of leaf nodes, wherein the root node contains root node entries, each root node entry pointing to a leaf node containing log record identifiers within a specified range.

13. The machine-storage medium of claim 12, wherein each entry in the leaf nodes identifies a range of log records in the disk-based log store.

14. The machine-storage medium of claim 12, wherein existing root and leaf nodes are reused without allocating or freeing root or leaf nodes.

15. The machine-storage medium of claim 14, wherein no split or merge operation is performed on nodes of the on-disk transaction log index.

16. The machine-storage medium of claim 14, wherein no merge or compaction operation is performed across levels of the on-disk transaction log index and there is no amplification of input or output operations in the on-disk transaction log index.

17. A method comprising:

receiving a request to write a transaction log pertaining to a plurality of database transactions, the transaction log having a plurality of log records, each log record having an identifier;

asynchronously storing the transaction log in a disk-based log store;

indexing the plurality of log records in an in-memory transaction log index;

in response to a determination that the plurality of log records are not missing any log records in an ordered sequence of log records, updating an on-disk transaction log index in the disk-based log store by storing log record identifiers in the on-disk transaction log index in order; and deleting the plurality of log records in the ordered sequence from the in-memory transaction log index, to allow in-memory index capacity to be reclaimed after an ordered on-disk update.

18. The method of claim 17, wherein the updating of the on-disk transaction log index is further performed in response to at least one of one or more additional correctness and one or more performance considerations.

19. The method of claim 17, wherein the updating further comprises persisting all log record identifiers equal to or below a certain value to the on-disk transaction log index while maintaining all log record identifiers above the certain value in the in-memory transaction log index, and wherein the deleting the log record identifiers comprises deleting log record identifiers equal to or below the certain value from the in-memory transaction log index.

20. The method of claim 17, wherein the on-disk transaction log index is two levels, a root node and a plurality of leaf nodes, wherein the root node contains root node entries, each root node entry pointing to a leaf node containing log record identifiers within a specified range.

* * * * *